(12) United States Patent
Satou et al.

(10) Patent No.: US 6,912,899 B2
(45) Date of Patent: *Jul. 5, 2005

(54) FLOW RATE SENSOR HAVING A HOLDER SUPPORTED AS A CANTILEVER

(75) Inventors: Souichi Satou, Hyogo (JP); Hiroyuki Uramachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,476

(22) Filed: Sep. 16, 2003

(65) Prior Publication Data

US 2004/0058589 A1 Mar. 25, 2004

(30) Foreign Application Priority Data

Sep. 20, 2002 (JP) ........................................ 2002-274934

(51) Int. Cl.⁷ ................................................ G01F 1/68
(52) U.S. Cl. .................. 73/204.22; 73/204.26
(58) Field of Search .......................... 73/202.5, 204.11, 73/204.22, 204.26, 201

(56) References Cited

U.S. PATENT DOCUMENTS 6,336,361 B1 * 1/2002 Uramachi et al. ....... 73/204.22
6,513,375 B2 * 2/2003 Uramachi et al. ....... 73/204.22
6,679,113 B2 * 1/2004 Uramachi ................ 73/204.22

FOREIGN PATENT DOCUMENTS

| JP | 02-249920 A | 10/1990 |
| JP | 11-132817 A | 5/1999 |
| JP | 2000-2572 A | 1/2000 |
| JP | 2000-346688 A | 12/2000 |

* cited by examiner

*Primary Examiner*—Edward Lefkowitz
*Assistant Examiner*—Corey D. Mack
(74) *Attorney, Agent, or Firm*—Sughrue Mion, PLLC

(57) ABSTRACT

An electrical connection portion between a flow rate detecting element and a circuit board is constructed on a portion of a holder positioned inside a holder insertion aperture. The holder is supported as a cantilever in an external structural member by fixing a base end portion of the holder to the external structural member.

4 Claims, 4 Drawing Sheets

FLOW RATE SENSOR HAVING A HOLDER SUPPORTED AS A CANTILEVER

BACKGROUND OF THE INVENTION

1. Field of the Invention

The present invention relates to a flow rate sensor for outputting a signal in response to a flow rate of a fluid being measured, and relates to a flow rate sensor suitable for measuring an intake air flow rate of an internal combustion engine in an automobile, for example.

2. Description of the Related Art

Generally, in an automotive engine, etc., an air-fuel mixture including intake air and fuel is burnt in a combustion chamber in an engine body, and rotational output from the engine is extracted from the resulting combustion pressure, requiring that an intake air flow rate be detected in order to calculate an injection rate, etc., for the fuel with high precision.

Conventional flow rate measuring apparatuses used in such applications are constituted by a casing, a mount plate, a circuit board, a flow rate detecting element, etc. The casing is constituted by: a collar-shaped mount portion formed on a base end portion of the casing; a circuit accommodating portion formed into a generally rectangular overall box shape and disposed so as to extend from the mount portion inside a conduit; and a connector portion formed on the mount portion so as to be positioned outside the conduit, the connector portion sending and receiving signals to and from an external portion. Disposed in the circuit accommodating portion are: a circuit board mount recess portion disposed inside the conduit, the circuit board mount recess portion being surrounded by a peripheral wall forming a rectangular shape; and a mount plate interfitting groove formed by cutting away a portion of the peripheral wall of the circuit board mount recess portion positioned near a tip end of the casing. The mount plate is composed of: a circuit board mount portion mounted to the circuit board mount recess portion and formed by bending edge portions of the mount plate on the left and right at positions facing the circuit board mount recess portion; and an element mount portion formed integrally near a tip end of the circuit board mount portion, the element mount portion fitting into the mount plate interfitting groove such that a tip end extends outside the casing, a rectangular element accommodating recess portion for accommodating the flow rate detecting element being formed in the element mount portion. The circuit board is disposed on the circuit board mount portion, terminals of the circuit board and the connector portion being connected by a plurality of bonding wires. The flow rate detecting element is mounted to the element accommodating recess portion such that a portion of the flow rate detecting element positioned near a tip end projects outside the casing. The connection portions of the flow rate detecting element and the circuit board are connected by a plurality of bonding wires. Finally, the circuit board mount recess portion is charged with a sealant composed of a silicone gel so as to cover the circuit board from a front surface side. In this conventional flow rate measuring apparatus, the flow rate detecting element is passed through an element insertion aperture and disposed partway along a bypass passage by mounting the base end portion of the casing to a mounting aperture on the conduit. (See Patent Literature 1, for example.)

Patent Literature 1: Japanese Patent Laid-Open No. 2000-2572 (Gazette, paragraphs 0024 to 0029, paragraph 0034, FIGS. 1 to 4)

If a conventional flow rate measuring apparatus is used as an intake air flow rate detecting apparatus in an internal combustion engine, for example, it is normally plugged in immediately downstream from an intake air filtration apparatus. This intake air filtration apparatus is fastened to a vehicle body or chassis inside an engine compartment. Thus, vibrational acceleration was comparatively small since vibrations to which the flow rate measuring apparatus is subjected were transmitted through the vehicle body or the chassis.

However, in recent years, with reductions in the size of engine compartments, intake air filtration apparatuses are increasingly being installed immediately above the engine and fastened to the engine. The flow rate measuring apparatus may also be fastened to a throttle body. This throttle body is fastened directly onto the engine. The vibrational acceleration of the vibrations to which the flow rate measuring apparatus is subjected in such cases is extremely large compared to cases where the flow rate measuring apparatus is plugged in immediately downstream from the intake air filtration device fastened to the vehicle body or chassis.

In this conventional flow rate measuring apparatus, because the collar-shaped mount portion constituting the base end portion of the casing is mounted to the mounting aperture of the conduit, when vibration such as that described above occurs, the vibrational mode is one of cantilever support in which the mount portion constitutes a fixed end and the end projecting inside the conduit constitutes a free end. In such cases, the amplitude of the casing is greatest at the free end, the vibrations of the casing being propagated directly to the flow rate detecting element and the bonding wires by the mount plate mounted to the circuit accommodating portion of the casing. The vibration of the casing is further amplified if the casing has a resonance point relative to the oscillation frequency region generated by the internal combustion engine. Thus, there has been a risk that excessive stresses will be repeatedly applied to the connection portions between the bonding wires disposed inside the sealant and the flow rate detecting element and the connection portions between the bonding wires and the circuit board, inducing delamination or wire breakages at the connection portions between the flow rate detecting element and the bonding wires or between the circuit board and the bonding wires, bringing about abnormalities in the output from the flow rate measuring apparatus.

Furthermore, it is possible that the flow rate measuring apparatus may be subjected to mechanical shock from an assembly tool as the flow rate measuring apparatus is being mounted to the internal combustion engine, or that the flow rate measuring apparatus may be subjected to mechanical shock due to dropping of the flow rate measuring apparatus. Because the mount plate is mounted to the casing such that the tip end portion of the element mount portion extends outside the casing, there has been a risk that if the tip end portion of the casing is subjected to mechanical shock from an assembly tool or mechanical shock due to dropping of the flow rate measuring apparatus, vibration will propagate directly to the flow rate detecting element and the bonding wires, inducing damage to the flow rate detecting element or delamination or wire breakages at the connection portions between the flow rate detecting element and the bonding wires or between the circuit board and the bonding wires, bringing about abnormalities in the output from the flow rate measuring apparatus.

In order to solve such problems, it is also conceivable for the flow rate detecting element to be disposed outside the fixed end of the vibrational mode, in other words, outside the conduit, but because it is necessary to dispose the flow rate detecting element at a predetermined position inside the bypass passage, the electrical connection portions of the flow rate detecting element must inevitably be positioned in the vicinity of a central axial position in the conduit. In other words, there is no choice but to dispose the electrical connection portions of the flow rate detecting element in the vicinity of the free end of the vibrational mode.

SUMMARY OF THE INVENTION

The present invention aims to solve the above problems and an object of the present invention is to provide a flow rate sensor enabling reliability to be improved by suppressing the occurrence of damage to a flow rate detecting element and wire breakages in electrical connection portions by providing a holder to which the flow rate detecting element is mounted, supporting the holder as a cantilever in an external structural member that is plugged into a main passage, and preventing vibration of a free end of the external structural member from propagating directly to a free end of the holder.

With the above object in view, a flow rate sensor of the present invention includes an external structural member having a support member and a detector passage disposed at a tip end portion of the support member, a holder insertion aperture being formed in the support member so as to communicate between a base end exterior portion of the support member and the detector passage. The sensor includes a holder mounted to the external structural member by being inserted into the holder insertion aperture such that an element holding portion disposed near a tip end of the holder projects into the detector passage. The sensor includes a flow rate detecting element for detecting a flow rate of a fluid being measured, the flow rate detecting element being disposed on the element holding portion. The sensor includes an electronic circuit portion for controlling an excitation current flowing to the flow rate detecting element, the electronic circuit portion being electrically connected to the flow rate detecting element. The flow rate sensor has a plug-in construction in which the external structural member is inserted into a mounting aperture that opens onto a main passage through which the fluid being measured flows so as to be positioned the detector passage in the main passage to detect the flow rate of the fluid being measured. The sensor is characterized in that an electrical connection portion between a flow rate detecting element and an electronic circuit portion is constructed on a portion of a holder positioned inside a holder insertion aperture, and the holder is supported as a cantilever in an external structural member by fixing a base end portion of the holder to the external structural member.

Because a holder is supported as a cantilever in a external structural member by fixing a base end portion of the holder to the external structural member, the external structural member and the holder vibrate in different vibrational modes. For that reason, even if the free end of the external structural member is subjected to vibrations or mechanical shocks generating excessive amplitude, vibration of the external structural member does not propagate directly to the free end of the holder. Thus, stresses acting on a flow rate detecting element disposed near the free end of the holder and electrical connection portions between an electronic circuit portion constructed on a portion of the holder positioned inside the holder insertion aperture and the flow rate detecting element are reduced significantly, enabling the reliability of the flow rate sensor to be improved.

DETAILED DESCRIPTION OF THE PREFERRED EMBODIMENTS

Preferred embodiments of the present invention will now be explained with reference to the drawings.

Embodiment 1

Figure 1:
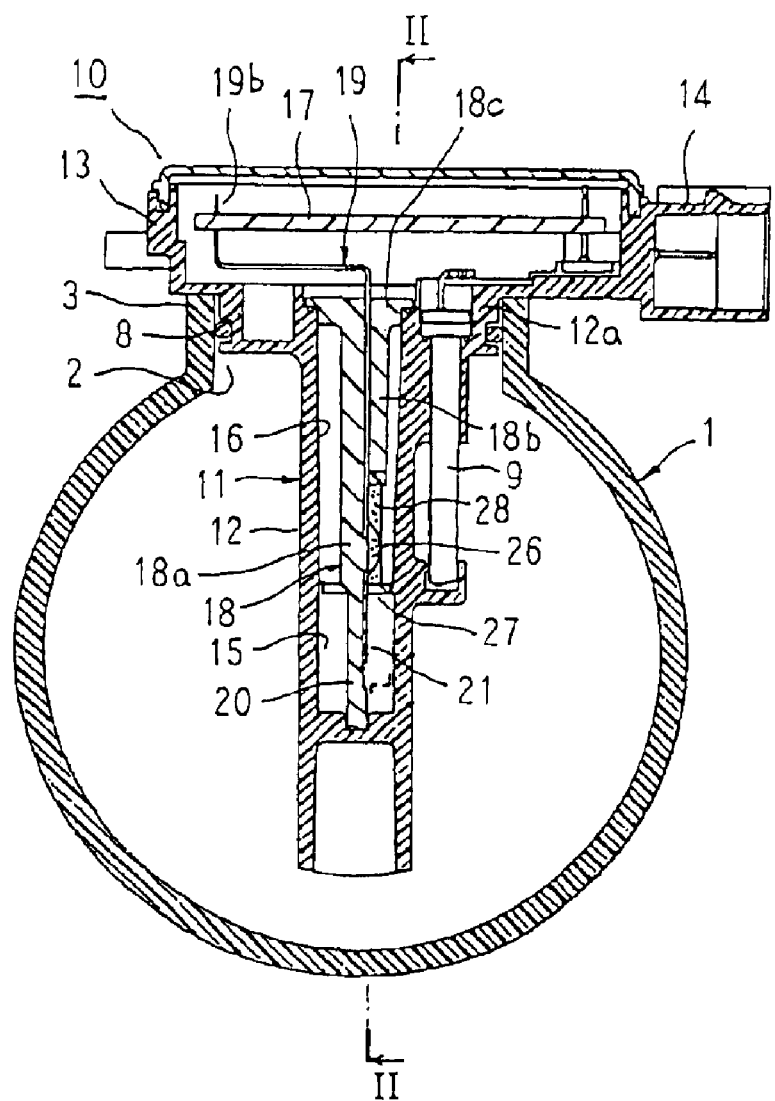
FIG. 1 is a longitudinal section showing a flow rate sensor according to Embodiment 1 of the present invention installed in a main passage.
Figure 2:
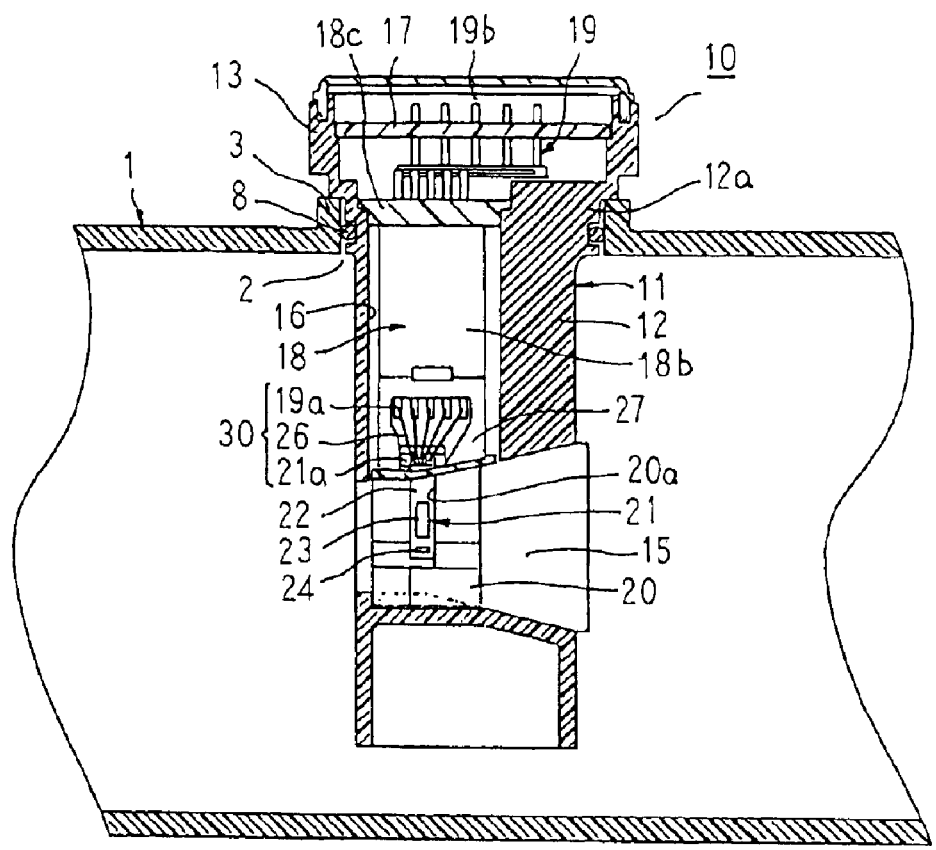
FIG. 2 is a cross section taken along line II—II in FIG. 1 viewed from the direction of the arrows.

FIG. 1 is a longitudinal section showing a flow rate sensor according to Embodiment 1 of the present invention installed in a main passage, and FIG. 2 is a cross section taken along line II—II in FIG. 1 viewed from the direction of the arrows. Moreover, a sealant 28 injected so as to cover the bonding wires 26 is omitted from FIG. 2 to improve clarity.

In FIGS. 1 and 2, a main passage 1 is a cylindrical pipe body through which a fluid being measured flows, a mounting aperture 2 being formed in a portion of a peripheral wall of the main passage 1 and a rim 3 being disposed so as to protrude from the peripheral wall of the main passage 1 so as to surround the mounting aperture 2. Moreover, in the case of an automotive internal combustion engine, this main passage 1 is prepared integrally with an intake air filtration apparatus (not shown) using a resin, for example, and is connected partway along an intake air line of the engine, the intake air filtration apparatus being disposed on an air intake side, and an intake air manifold (not shown) communicating with the inside of cylinders of the engine being connected by means of a throttle valve, etc., (not shown) to a second end of the main passage 1. In that case, the fluid being measured is air.

A flow rate sensor 10 is constituted by an external structural member 11, a circuit board 17, a holder 18, a flow rate detecting element 21, etc.

The external structural member 11 is constituted by: a support member 12, a collar-shaped interfitting portion 12a being formed on a base end portion of the support member 12; a circuit case 13 functioning as a circuit housing portion for housing the circuit board 17 inside, the circuit case 13 being formed on the support member 12 near the interfitting portion 12a; a connector 14 formed integrally with the circuit case 13 for supplying electric power to the flow rate sensor 10 and extracting a flow rate detection signal from the thermosensitive flow rate sensor 10; and a detector passage 15 formed near a tip end of the support member 12, the external structural member 11 being prepared integrally using a resin material such as polybutylene terephthalate, for example. A holder insertion aperture 16 is formed in the support member 12 so as to communicate between the circuit case 13 and the detector passage 15.

The circuit board 17, which functions as an electronic circuit portion, is housed inside the circuit case 13, electronic components being mounted to the circuit board 17 so as to constitute a circuit for controlling the flow rate detecting element 21.

The holder 18 is constructed such that a first end portion is formed into a flat, elongated, stepped shape constituting a thin portion 18a, and a collar-shaped mount portion 18c is formed at a second end. A plurality of terminal conductors 19 are insert molded into the holder 18. First ends 19a of the terminal conductors 19 project onto the thin portion 18a from a thick portion 18b such that surfaces of the terminal conductors 19 are positioned in a common plane with a major surface of the thin portion 18a, second ends 19b thereof projecting from the mount portion 18c. In addition, a flat element holding portion 20 is disposed so as to extend from a first end of the thin portion 18a of the holder 18 so as to be positioned in a common plane with the major surface of the thin portion 18a. A rectangular element accommodating recess portion 20a for accommodating the flow rate detecting element 21 is formed in a major surface of the element holding portion 20. The holder 18 and the element holding portion 20 are formed integrally using a resin material such as a polybutylene terephthalate, for example.

The flow rate detecting element 21 is provided with: a rectangular silicon substrate 22; and a flow rate detection resistor 23 and a temperature-compensating resistor 24 formed by patterning a platinum film coated onto a major surface of the silicon substrate 22, the flow rate detecting element 21 being accommodated inside the element accommodating recess portion 20a so as to be positioned in a common plane with the major surface of the element holding portion 20, a rear surface of the flow rate detecting element 21 being secured by an adhesive to a bottom surface of the element accommodating recess portion 20a. Electrode terminals 21a of the flow rate detecting element 21 and the first ends 19a of the terminal conductors 19 projecting from the thick portion 18b are each electrically connected by bonding wires 26. Moreover, the joint portions between the electrode terminals 21a of the flow rate detecting element 21 and the bonding wires 26, the joint portions between the first ends 19a of the terminal conductors 19 and the bonding wires 26, and the bonding wires 26 themselves constitute an electrical connection portion 30 between the circuit board 17 and the flow rate detecting element 21.

The peripheral wall member 27 is formed into a generally rectangular frame shape using a resin such as a polybutylene terephthalate, for example. This peripheral wall member 27 is placed on the holder 18 so as to surround the electrical connection portion 30 between the circuit board 17 and the flow rate detecting element 21, the bottom surface of the peripheral wall member 27 being secured by an adhesive to the major surfaces of the thin portion 18a constituting a portion of the holder 18 and the element holding portion 20 and the major surface of the flow rate detecting element 21. A sealant 28 composed of a silicone resin, etc., for example, is injected inside the peripheral wall member 27 and cured so as to embed the electrical connection portion 30.

The holder 18 with the flow rate detecting element 21 mounted in this manner is mounted airtightly to the external structural member 11 by accommodating the holder 18 inside the holder insertion aperture 16 of the support member 12 such that the element holding portion 20 at the first end of the holder 18 projects into the detector passage 15, and fixing the mount portion 18c to a base end portion of the support member 12 using an adhesive.

The second ends 19b of the terminal conductors 19 projecting into the circuit case 13 from the holder 18 are electrically connected to the circuit board 17. The electronic components mounted to the circuit board 17 constitute a control circuit for controlling an excitation current flowing to the flow rate detection resistor 23, etc. Moreover, an intake air temperature sensor 9 is disposed on a side portion of the support member 12 of the external structural member 11.

The flow rate sensor 10 constructed in this manner is plugged into the main passage 1 by mounting an O ring 8 to the interfitting portion 12a of the external structural member 11, inserting the support member 12 so as to project inside the main passage 1 from the mounting aperture 2, and fastening the circuit case 13 to the main passage 1 securely by a fixing screw (not shown). The flow rate sensor 10 is mounted to the main passage 1 airtightly by disposing the O ring 8 in a compressed state between the mounting aperture 2 and the interfitting portion 12a. A central axis of the detector passage 15 is generally aligned with a central axis of the main passage 1.

Here, the element holding portion 20 passes through the central axis of the detector passage 15 (aligned with a direction of flow of the fluid being measured in a direction perpendicular to the surface of the page in FIG. 1), being disposed so as to divide the passage cross section of the detector passage 15 perpendicular to the central axis generally into two sections. The major surface of the element holding portion 20, in other words, the major surface of the flow rate detecting element 21, is generally parallel to the central axis of the detector passage 15, the flow rate detection resistor 23 being positioned at the position of the central axis of the detector passage 15.

The fluid being measured flowing through the inside of the main passage 1 is directed inside the detector passage 15 and flows over the surface of the flow rate detecting element 21. The excitation current flowing to the flow rate detection resistor 23 is controlled by the control circuit mounted to the circuit board 17 such that the average temperature of the flow rate detection resistor 23 is a predetermined amount higher than the temperature of the fluid being measured as detected by the temperature-compensating resistor 24. The flow rate of the fluid being measured flowing through the inside of the main passage 1 is detected by extracting this excitation current as a detected flow rate signal.

According to Embodiment 1, the interfitting portion 12a on the base end of the external structural member 11 is mounted to the mounting aperture 2 of the main passage 1 with the O ring 8 interposed such that the support member 12 and the detector passage 15 project into the main passage 1. In other words, the external structural member 11 is supported as a cantilever in the main passage 1. The holder 18 is supported as a cantilever in the external structural member 11 by securing the mount portion 18c positioned at the second end of the holder 18 by adhesive to the base end portion of the support member 12. The portions of the holder 18 projecting inside the holder insertion aperture 16 and the detector passage 15 (the thin portion 18a, the thick portion 18b, and the element holding portion 20) are in a state of non-contact relative to the external structural member 11.

Thus, when the flow rate sensor 10 is subjected to vibration, the external structural member 11 vibrates in a vibrational mode of cantilever support in which the fixed portion between the circuit case 13 and the main passage 1 is the fixed end and the end portion in the detector passage 15 is the free end. On the other hand, the holder 18 vibrates in a vibrational mode of cantilever support in which the fixed portion between the mount portion 18c and the base end portion of the support member 12 is the fixed end and the end portion of the element holding portion 20 is the free end. Here, since the external structural member 11 and the holder 18 each have different natural frequencies, the external structural member 11 and the holder 18 vibrate in different vibrational modes. Furthermore, as stated above, the portions of the holder 18 projecting inside the holder insertion aperture 16 and the detector passage 15 are in a state of non-contact relative to the external structural member 11. For that reason, even if the free end of the external structural member 11 is subjected to vibrations or mechanical shocks generating excessive amplitude, because the vibration of the external structural member 11 does not propagate directly to the free end of the holder 18, stresses acting on the flow rate detecting element 21 and the electrical connection portions 30 between the circuit board 17 and the flow rate detecting element 21 (the joint portions between the bonding wires 26 and the flow rate detecting element 21, the joint portions between the bonding wires 26 and the terminal conductors 19, and the bonding wires 26 themselves) are reduced significantly compared to a flow rate sensor in which the external structural member and the holder are integrated.

Consequently, even if this flow rate sensor 10 is applied to cases where the intake air filtration apparatus is installed directly above an engine and fastened to the engine, or even when the flow rate sensor 10 is fastened to a throttle body, the occurrence of damage to the flow rate detecting element 21 or delamination or wire breakages at the joint portions between the bonding wires 26 and the flow rate detecting element 21 and between the bonding wires 26 and the terminal conductors 19 is suppressed, enabling a highly-reliable flow rate sensor 10 providing stable output to be achieved.

Because the circuit board 17 is housed in the circuit case 13, which is formed integrally with the interfitting portion 12a of the support member 12, the circuit board 17 is positioned in the vicinity of the fixed end of the vibrational mode of the external structural member 11. Because of this, even if the external structural member 11 vibrates, the occurrence of wire breakages, etc., in the circuit board 17 is suppressed because the amplitude at the circuit board 17 is extremely small, reducing the stresses acting on the circuit board 17, thereby improving reliability. Furthermore, because the circuit board 17 is disposed outside the main passage 1, the portion of the sensor projecting inside the main passage 1 is reduced, also reducing obstruction to the flow of the fluid being measured flowing inside the main passage 1.

If mechanical shock from an assembly tool acts on the flow rate sensor 10 when the flow rate sensor 10 is being mounted to the internal combustion engine, because the vibration of the external structural member 11 does not propagate directly to the flow rate detecting element 21 and the electrical connection portions 30 of the holder 18, the occurrence of damage to the flow rate detecting element 21 or delamination or wire breakages at the joint portions between the bonding wires 26 and the flow rate detecting element 21 and between the bonding wires 26 and the terminal conductors 19 is suppressed, thereby preventing the occurrence of abnormalities in the output from the flow rate sensor 10.

Embodiment 2

Figure 3:
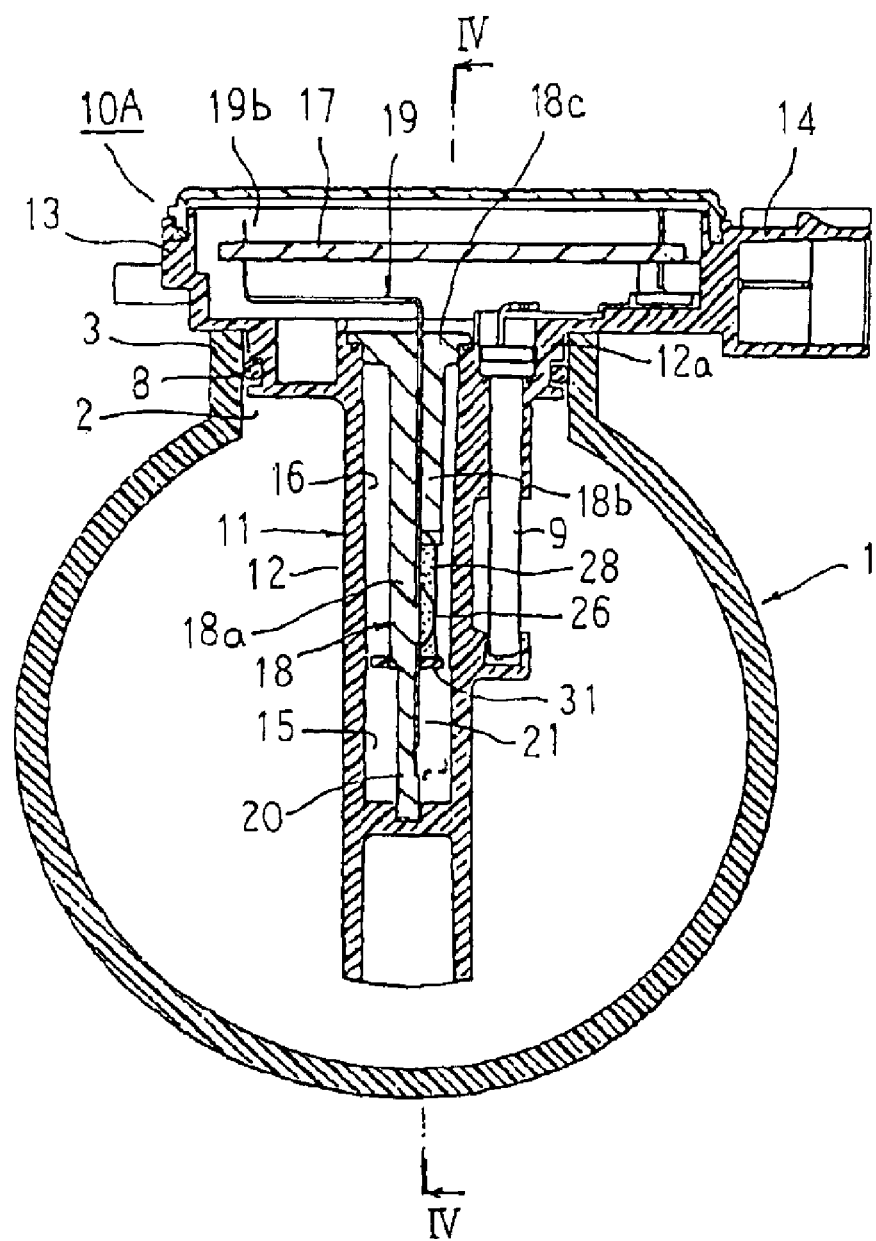
FIG. 3 is a longitudinal section showing a flow rate sensor according to Embodiment 2 of the present invention installed in a main passage.
Figure 4:
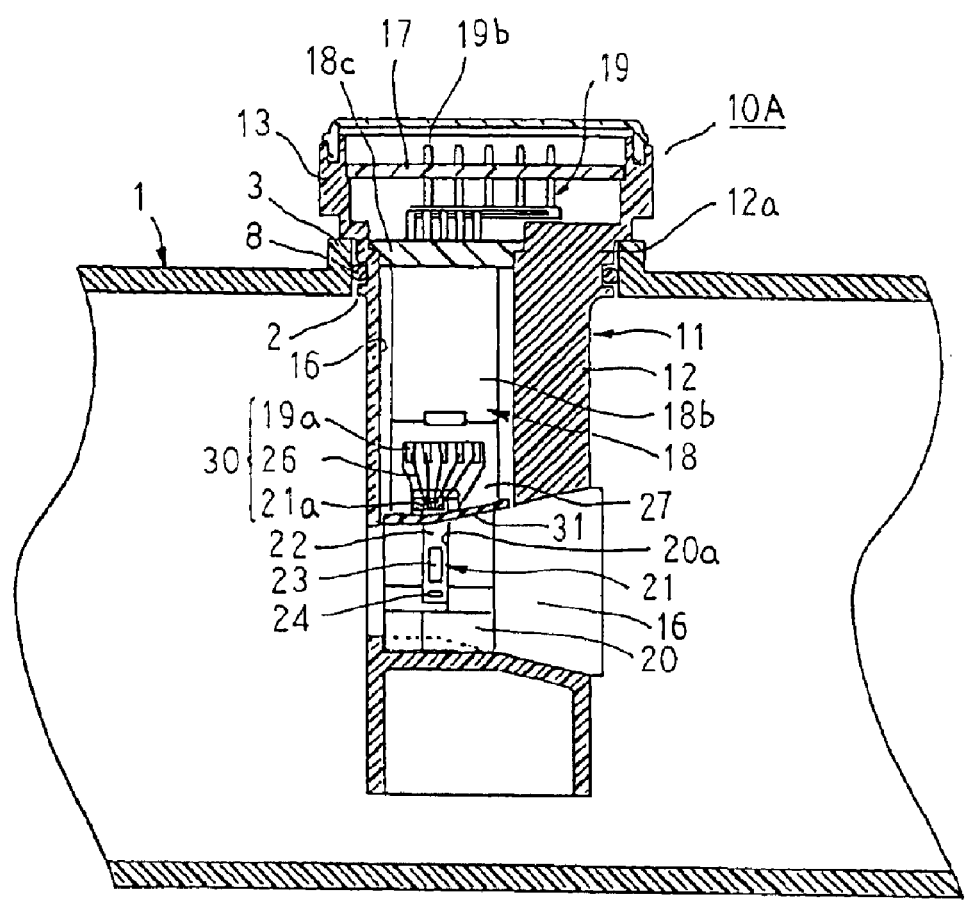
FIG. 4 is a cross section taken along line IV—IV in FIG. 2 viewed from the direction of the arrows.

FIG. 3 is a longitudinal section showing a flow rate sensor according to Embodiment 2 of the present invention installed in a main passage, and FIG. 4 is a cross section taken along line IV—IV in FIG. 2 viewed from the direction of the arrows. Moreover, a sealant 28 injected so as to cover the bonding wires 26 is omitted from FIG. 4 to improve clarity.

In a flow rate sensor 10A according to Embodiment 2, as shown in FIGS. 3 and 4, an elastic body 31 is disposed around an entire perimeter of a first end portion of the thin portion 18a of the holder 18 so as to have a predetermined clearance from an inner wall surface of the holder insertion aperture 16. The holder 18 is mounted airtightly to the external structural member 11 by securing the mount portion 18c positioned at the second end of the holder 18 by adhesive to the base end portion of the support member 12. Here, the elastic body 31 should have vibration-damping properties and a silicone rubber, for example, can be used.

Moreover, the rest of this embodiment is constructed in a similar manner to Embodiment 1 above.

Consequently, in Embodiment 2, because the holder 18 is also supported as a cantilever in the external structural member 11, and the portions of the holder 18 projecting inside the holder insertion aperture 16 and the detector passage 15 (the thin portion 18a, the thick portion 18b, and the element holding portion 20) are also in a state of non-contact relative to the external structural member 11, and the external structural member 11 is also supported as a cantilever in the main passage 1, the occurrence of damage to the flow rate detecting element 21 or delamination or wire breakages at the joint portions between the bonding wires 26 and the flow rate detecting element 21 and between the bonding wires 26 and the terminal conductors 19 is suppressed, enabling a highly-reliable flow rate sensor 10A providing stable output to be achieved in a similar manner to Embodiment 1 above.

Furthermore, in Embodiment 2, because the elastic body 31 is disposed around the entire perimeter of the first end portion of the thin portion 18a of the holder 18, even if a situation arises such as the external structural member 11 and the holder 18 coming into contact with each other at the free end when the external structural member 11 and the holder 18 are vibrating in different vibrational modes, the external structural member 11 and the holder 18 come into contact with each other through the elastic body 31. Thus, because vibration propagating from the external structural member 11 to the holder 18 is damped by the elastic body 31, the occurrence of damage to the flow rate detecting element 21 or delamination or wire breakages at the joint portions between the bonding wires 26 and the flow rate detecting element 21 and between the bonding wires 26 and the terminal conductors 19 is reliably suppressed, further improving the reliability of the flow rate sensor 10A.

Now, in Embodiment 2 above, the elastic body 31 is explained as being disposed around the entire perimeter of the first end portion of the thin portion 18a of the holder 18, but the elastic body 31 may also be disposed on an inner peripheral wall surface of the holder insertion aperture 16 of the external structural member 11.

The elastic body 31 does not necessarily have to be disposed around the entire perimeter of the first end portion of the thin portion 18a of the holder 18, and may also be disposed around a portion of the perimeter.

It also goes without saying that the position where the elastic body 31 is disposed is not limited to the first end portion of the thin portion 18a of the holder 18.

Furthermore, in Embodiment 2 above, the elastic body 31 is disposed on the thin portion 18a of the holder 18 so as to have a predetermined clearance from the inner wall surface of the holder insertion aperture 16, but the elastic body 31 may also be disposed so as to fill a gap between the inner wall surface of the holder insertion aperture 16 and the first end portion of the thin portion 18a of the holder 18. In that case also, the holder 18 is supported as a cantilever in the external structural member 11 without the first end portion of the thin portion 18a of the holder 18 being fixed to the external structural member 11, and the external structural member 11 and the holder 18 vibrate in different vibrational modes. Because the elastic body 31 is inserted between the inner wall surface of the holder insertion aperture 16 and the first end portion of the thin portion 18a of the holder 18, some vibration propagates from the external structural member 11 through the elastic body 31 to the holder 18. However, because the vibration propagating from the external structural member 11 through the elastic body 31 to the holder 18 is damped by the elastic body 31, the occurrence of damage to the flow rate detecting element 21 or delamination or wire breakages at the joint portions between the bonding wires 26 and the flow rate detecting element 21 and between the bonding wires 26 and the terminal conductors 19 is reliably suppressed.

Moreover, in each of the above embodiments, the flow rate detection resistor 23 and the temperature-compensating resistor 24 are formed in combination on the silicon substrate 22 of the flow rate detecting element 21. In this case, a heat insulation means (not shown) is applied to the silicon substrate 22 so that heat from the flow rate detection resistor 23 is not transferred to the temperature-compensating resistor 24.

In each of the above embodiments, the temperature-compensating resistor 24 does not necessarily have to be formed on the silicon substrate 22; the flow rate detection resistor 23 may be formed on the silicon substrate 22 alone.

In each of the above embodiments, the substrate on which the flow rate detection resistor 23 and the temperature-compensating resistor 24 are formed is not limited to the silicon substrate 22; any electrical insulator such as a ceramic, etc., can be used.

In each of the above embodiments, the material constituting the flow rate detection resistor 23 and the temperature-compensating resistor 24 is not limited to platinum; nickel or a nickel-iron alloy (such as permalloy, trademark of the Western Electric Company) can be used, for example.

In each of the above embodiments, the support member 12 and the circuit case 13 constituting the external structural member 11 are prepared integrally using a resin material, but an external structural member may also be prepared by preparing the support member 12 and the circuit case 13 as separate parts then integrating them by fixing them together with an adhesive, etc. In addition, the interfitting portion 12a may also be prepared as a separate part from the support member 12, and then the interfitting portion 12a and the support member 12 integrated by fixing with an adhesive, etc.

In each of the above embodiments, the electrode terminals 21a of the flow rate detecting element 21 and the first ends 19a of the terminal conductors 19 are explained as being electrically connected by wire bonding, but the electrical connection method is not limited to wire bonding; tape automated bonding (TAB), flip chip bonding, an anisotropic electrically-conductive film (ACF), an anisotropic electrically-conductive adhesive, etc., may also be used.

In addition, in each of the above embodiments, the mount portion 18c of the holder 18 is fixed to the base end of the external structural member 11 using an adhesive, but it is sufficient for the mount portion 18c to be fixed to the external structural member 11 and, for example, snap-fitting by press fitting or fastening by heat welding is also acceptable.

In each of the above embodiments, the circuit board 17 is disposed inside the circuit case 13 of the external structural member 11, but the circuit board 17 may also be disposed in the holder 18. In that case, the thin portion 18a of the holder 18 should be expanded toward the mount portion 18c and the circuit board 17 mounted to the extended thin portion 18c. Then, the end portions of the insert conductors 19 insert-molded into the thick portion 18b and the circuit board 17 are electrically connected, the circuit board 17 and the flow rate detecting element 21 are electrically connected, and finally, the sealant 28 is disposed so as to embed these electrical connection portions and the circuit board 17.

In each of the above embodiments, the portions of the holder 18 projecting inside the holder insertion aperture 16 and the detector passage 15 (the thin portion 18a, the thick portion 18b, and the element holding portion 20) are explained as being in non-contact relative to the external structural member 11, but similar effects can also be achieved even if the projecting portions come into partial contact with the external structural member 11 provided that they are not fixed to the external structural member 11.

What is claimed is:

1. A flow rate sensor comprising:

an external structural member having a support member and a detector passage disposed at a tip end portion of said support member, a holder insertion aperture being formed in said support member so as to communicate between a base end exterior portion of said support member and said detector passage;

a holder mounted to said external structural member by being inserted into said holder insertion aperture such that an element holding portion disposed near a tip end of said holder projects into said detector passage;

a flow rate detecting element for detecting a flow rate of a fluid being measured, said flow rate detecting element being disposed on said element holding portion; and an electronic circuit portion for controlling an excitation current flowing to said flow rate detecting element, said electronic circuit portion being electrically connected to said flow rate detecting element, said flow rate sensor having a plug-in construction in which said external structural member is inserted into a mounting aperture that opens onto a main passage through which said fluid being measured flows so as to be positioned with said detector passage in said main passage to detect said flow rate of said fluid being measured, wherein:

an electrical connection portion between said flow rate detecting element and said electronic circuit portion is constructed on a portion of said holder positioned inside said holder insertion aperture, and said holder is supported as a cantilever in said external structural member by fixing a base end portion of said holder to said external structural member.

2. The flow rate sensor according to claim 1, further comprising:

a circuit housing portion disposed near a base end of said support member; and a terminal conductor embedded in said holder such that a first end of said terminal conductor is exposed near said element holding portion and a second end projects outward at said base end, wherein said flow rate detecting element being electrically connected to said first end of said terminal conductor, and said electronic circuit portion being housed in said circuit housing portion and electrically connected to said second end of said terminal conductor.

3. The flow rate sensor according to claim 1, wherein:

an elastic body having vibration-damping properties is disposed between an inner wall surface of said holder insertion aperture and said holder.

4. The flow rate sensor according to claim 3, further comprising:

a circuit housing portion disposed near a base end of said support member; and a terminal conductor embedded in said holder such that a first end of said terminal conductor is exposed near said element holding portion and a second end projects outward at said base end, wherein said flow rate detecting element being electrically connected to said first end of said terminal conductor, and said electronic circuit portion being housed in said circuit housing portion and electrically connected to said second end of said terminal conductor.

* * * * *